United States Patent [19]

Darrow

[11] Patent Number: 4,868,069
[45] Date of Patent: Sep. 19, 1989

[54] ABRASION-RESISTANT COATING

[75] Inventor: David S. Darrow, Portville, N.Y.

[73] Assignee: The Dexter Corporation, Windsor Locks, Conn.

[21] Appl. No.: 231,155

[22] Filed: Aug. 11, 1988

[51] Int. Cl.$^4$ ................................................ B32B 5/16
[52] U.S. Cl. .................................... 428/610; 428/614; 428/627; 428/687; 428/143; 428/148; 428/149; 51/307; 51/309
[58] Field of Search ............... 428/149, 148, 143, 141, 428/698, 323, 610, 627, 614, 687; 51/295, 307, 309

[56] References Cited

U.S. PATENT DOCUMENTS

| | | |
|---|---|---|
| 3,305,326 | 2/1967 | Longo . |
| 3,313,633 | 4/1967 | Longo . |
| 3,600,201 | 8/1971 | Alessi . |
| 4,399,168 | 8/1983 | Kullander et al. . |
| 4,406,669 | 9/1983 | Sarin et al. . |
| 4,406,670 | 9/1983 | Sarin et al. . |
| 4,519,840 | 5/1985 | Jackson et al. . |
| 4,526,618 | 7/1985 | Keshavan . |
| 4,626,476 | 12/1986 | Londry et al. . |
| 4,626,477 | 12/1986 | Jackson et al. . |
| 4,643,740 | 2/1987 | Nicolson . |
| 4,710,425 | 12/1987 | Baldoni et al. . |
| 4,713,286 | 12/1987 | Bunting et al. ...................... 428/323 |
| 4,744,725 | 5/1988 | Matarese et al. ................... 428/143 |

Primary Examiner—Alexander S. Thomas
Attorney, Agent, or Firm—Fish & Richardson

[57] ABSTRACT

A coated substrate in which the coating includes abrasion-resistant particles protruding from the hardened surface of a metal matrix and is bonded to the substrate.

14 Claims, No Drawings

ABRASION-RESISTANT COATING

BACKGROUND OF THE INVENTION

This invention relates to abrasion-resistant coatings.

Abrasion is frequently caused by hard particles, e.g., silica, sliding along or impinging upon a softer material such as steel. One known way of improving the abrasion resistance of these materials is to provide them with a hard, brittle surface. A second approach is to coat them with a relatively soft metal matrix in which abrasion-resistant grit particles are embedded.

SUMMARY OF THE INVENTION

In general, the invention features a coated substrate in which the coating is bonded to the substrate and includes abrasion-resistant particles protruding from the hardened surface of a metal matrix (i.e. the surface is hardened relative to the bulk of the metal matrix).

In preferred embodiments, the coating is metallurgically bonded to the substrate. The hardened surface of the metal matrix preferably includes a boride, carbide, nitride, or carbonitride of the matrix metal. Preferred matrix metals include nickel and its alloys and cobalt and its alloys. The abrasion-resistant particles are preferably a metal boride, carbide, nitride, or carbonitride. Examples of preferred metals include tungsten, vanadium, titanium, tantalum, niobium, chromium, molybdenum, or mixtures of these metals. Particularly preferred abrasion-resistant particles are tungsten carbide and titanium carbide particles, alone or in combination with each other. The preferred substrate is steel.

The hardness of the coated substrate preferably is at least 55 Rockwell C, more preferably at least 1200 knoop. Its impact resistance is preferably at least 1.5 ft. lbs, more preferably at least 10 ft. lbs. A particularly preferred coated substrate is one in which the coating is metallurgically bonded to a steel substrate; the metal matrix is nickel, cobalt, or one of their alloys; and the abrasion-resistant particles are tungsten carbide or titanium carbide particles, alone or in combination with each other, the coated substrate having a hardness of at least 1200 knoop and an impact resistance of at least 10 ft. lbs.

The invention provides tough, impact-resistant coatings that are hard enough to resist abrasion. The full potential of the abrasion-resistant particles can be realized because the hardened metal surface surrounding the particles does not wear away as rapidly in use. This prevents the particles from dislodging.

Other features and advantages of the invention will be apparent from the following description of the preferred embodiments thereof, and from the claims.

DESCRIPTION OF THE PREFERRED EMBODIMENTS

Preferred coated substrates consist of a steel substrate metallurgically bonded to a coating of nickel or cobalt from whose surface abrasion-resistant tungsten carbide or titanium carbide grit particles protrude. The nickel or cobalt surface surrounding the grit particles is hardened by conversion to a nickel or cobalt boride, carbide, nitride, or carbonitride. The coated substrates preferably exhibit a hardness of at least 1200 knoop and an impact resistance of at least 10 ft. lbs.

Hardening the metal surface surrounding the grit particles increases the abrasion resistance of the surface relative to the softer, underlying nickel or cobalt. This prevents the grit particles from dislodging because the surrounding surface remains intact rather than wearing away. Embedding grit particles in the hardened coating prevents catastrophic cracks from developing in the hardened coating; such cracks can cause the coating to chip or flake off. The particles act as "crack-stoppers", terminating the growth of propagating cracks when the crack tip reaches the particles. Metallurgically bonding the steel substrate to the coating (rather than physically bonding the two materials together) leads to good impact resistance.

The coated substrates are generally prepared in two steps. In the first step, the coating is applied to the substrate by flame spraying a spray-weldable, self-fluxing metal powder onto the substrate using a plasma or acetylene flame spray gun. The powder typically consists of a nickel or cobalt base metal, fluxing element (e.g., boron or silicon), and carbide grit particles (e.g., tungsten or titanium carbide particles). Examples of suitable powders are described in Longo, U.S. Pat. No. 3,313,633, entitled "High Temperature Flame Spray Powder" and Longo, U.S. Pat. No. 3,305,326, entitled "Self-Fusing Flame Spray Material," both of which are hereby incorporated by reference. Following flame spraying, the coating may be fused by heating in a furnace if desired.

In the second step, the surface of the nickel or cobalt coating surrounding the grit particles is borided, carbided, nitrided, or carbonitrided using conventional techniques to harden it. The grit particles are not affected by the hardening treatment.

Carbiding typically is accomplished by passing a hydrocarbon gas, e.g., methane over the surface of the coating; carbon monoxide may also be used. A liquid process, involving the application of molten barium, sodium, or potassium cyanide to the surface may also be used, as well as a solid phase process in which coke is diffused into the surface. Carbonitriding is performed according to an analogous procedure.

Nitriding typically is carried out by exposing the surface of the coating to ammonia gas at a temperature between 900° and 1200° F. (usually between 930° and 1000° F).

Boriding typically involves placing either boron carbide or boron nitride powder on the surface of the coating and then heating the material at about 2000° F. for approximately 6–18 hours. This causes boron to diffuse into the metal coating (preferably to a depth of about 0.012 inch) and react with the metal to form the surface metal boride in the areas surrounding the protruding grit particles.

Specific coated substrates were prepared as follows.

EXAMPLE 1

A 4140 steel was flame sprayed with Stellite 35 (containing 65% tungsten carbide grit and 35% nickel base metal) to form a nickel coating with embedded tungsten carbide grit particles. When this coating was struck with a hammer or chisel, a visible dent resulted; there was no visually detectable effect on abrasion resistance. The surface of the coating was then borided as described above to form nickel boride in the surface areas surrounding the grit particles. The resulting coating could be struck with a hammer with no visible effect.

EXAMPLE 2

A steel substrate was coated with conformaclad (containing 65% tungsten carbide grit and 35% of a nickel-chrome-boron alloy as the base metal) to form a nickel alloy coating with embedded tungsten carbide grit particles. The hardness of this coating was approximately 55 Rockwell C. It could be dented with a hardened steel chisel. The surface of the coating was then borided as described above. The hardness of the surface-borided coating was measured and found to exceed 2000 knoop. Striking the coated substrate with a hammer failed to dent it.

Other embodiments are within the following claims.

I claim:

1. A coated substrate in which the coating is bonded to the substrate,
   said coating comprising abrasion-resistant particles that protrude from a metal matrix having a surface that is hardened relative to the bulk of said metal matrix.

2. The coated substrate of claim 1 wherein the hardened surface of said metal matrix comprises a boride, carbide, nitride, or carbonitride of said metal.

3. The coated substrate of claim 1 wherein said substrate comprises steel.

4. The coated substrate of claim 1 wherein said metal matrix comprises nickel or an alloy thereof.

5. The coated substrate of claim 1 wherein said metal matrix comprises cobalt or an alloy thereof.

6. The coated substrate of claim 1 wherein said abrasion-resistant particles comprise metal boride, carbide, nitride, or carbonitride particles.

7. The coated substrate of claim 6 wherein said metal comprises tungsten, vanadium, titanium, tantalum, niobium, chromium, molybdenum, or a mixture thereof.

8. The coated substrate of claim 6 wherein said abrasion-resistant particles comprise tungsten carbide, titanium carbide, or a mixture thereof.

9. The coated substrate of claim 1 wherein the hardness of said coated substrate is at least 55 Rockwell C.

10. The coated substrate of claim 9 wherein the hardness of said coated substrate is at least 1200 knoop.

11. The coated substrate of claim 1 wherein the impact resistance of said coated substrate is at least 1.5 ft. lbs.

12. The coated substrate of claim 11 wherein the impact resistance of said coated substrate is at least 10 ft. lbs.

13. The coated substrate of claim 1 wherein said coating is metallurgically bonded to said substrate.

14. The coated substrate of claim 1 wherein said coating is metallurgically bonded to said substrate, said substrate is steel, said metal matrix is nickel, cobalt, or one of their alloys, and said abrasion-resistant particles are tungsten carbide or titanium carbide particles, alone or in combination with each other,
    said coated substrate having a hardness of at least 1200 knoop and an impact resistance of at least 10 ft. lbs.

* * * * *